US012154477B2

(12) United States Patent
Otsuka

(10) Patent No.: US 12,154,477 B2
(45) Date of Patent: Nov. 26, 2024

(54) IMAGE PROCESSING SYSTEM, IMAGE PROCESSING INTEGRATED CIRCUIT, AND IMAGE PROCESSING METHOD

(71) Applicant: SONY INTERACTIVE ENTERTAINMENT INC., Tokyo (JP)

(72) Inventor: Katsushi Otsuka, Aichi (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 397 days.

(21) Appl. No.: 17/617,408

(22) PCT Filed: Dec. 26, 2019

(86) PCT No.: PCT/JP2019/051271
§ 371 (c)(1),
(2) Date: Dec. 8, 2021

(87) PCT Pub. No.: WO2020/261617
PCT Pub. Date: Dec. 30, 2020

(65) Prior Publication Data
US 2022/0246085 A1 Aug. 4, 2022

(30) Foreign Application Priority Data
Jun. 27, 2019 (JP) .................. 2019-120106

(51) Int. Cl.
G09G 3/20 (2006.01)
G06F 1/14 (2006.01)
(Continued)

(52) U.S. Cl.
CPC ............. *G09G 3/2096* (2013.01); *G06F 1/14* (2013.01); *G06F 3/1423* (2013.01); *G06F 21/602* (2013.01)

(58) Field of Classification Search
CPC ......... G09G 3/2096; G09G 2310/0221; G09G 2340/0428; G09G 2350/00;
(Continued)

(56) References Cited
U.S. PATENT DOCUMENTS 10,672,098 B1* 6/2020 Chemparathy .......... G09G 5/39
2003/0231193 A1* 12/2003 Shimazaki ............. H04N 9/641
348/E5.074
(Continued)

FOREIGN PATENT DOCUMENTS

JP H05-80714 A 4/1993
JP 2018011198 A 1/2018
(Continued)

OTHER PUBLICATIONS

International Search Report and Written Opinion mailed Feb. 10, 2020, from PCT/JP2019/051271, 9 sheets.

*Primary Examiner* — Thai Q Tran
*Assistant Examiner* — Stephen R Smith
(74) *Attorney, Agent, or Firm* — XSENSUS LLP

(57) ABSTRACT

A content processing apparatus 200 compresses image data of content in a lossy manner and transmits the image data to a head-mounted display 100 through an interface 300. An image processing integrated circuit 120 of the head-mounted display 100 transmits the image data to a display panel 122 through an interface 304 whose protocol is different from a
(Continued)

protocol of the interface 300, without decoding and decompressing the image data. The display panel 122 displays the image that has been decoded and decompressed after being transmitted through the interface 304.

18 Claims, 12 Drawing Sheets

(51) Int. Cl.
*G06F 3/14* (2006.01)
*G06F 21/60* (2013.01)

(58) Field of Classification Search
CPC ............... G09G 2370/08; G09G 5/006; G09G 2340/02; G06F 1/14; G06F 3/1423; G06F 21/602; G06F 3/012; G06F 2203/012; G06F 1/163; G06F 3/011; G06F 3/014; H04N 5/66; H04N 21/436; H04N 21/643
USPC ...................................... 386/328; 375/240.01
See application file for complete search history.

(56) References Cited

U.S. PATENT DOCUMENTS

| | | | |
|---|---|---|---|
| 2007/0035706 A1* | 2/2007 | Margulis | H04N 9/3102 |
| | | | 353/122 |
| 2009/0109988 A1* | 4/2009 | Musunuri | H04N 19/132 |
| | | | 370/412 |
| 2009/0147840 A1* | 6/2009 | Sahdra | H04N 21/4621 |
| | | | 375/E7.076 |
| 2014/0168237 A1* | 6/2014 | Lee | H04N 19/172 |
| | | | 345/520 |
| 2015/0071615 A1* | 3/2015 | Messmer | H04N 7/08 |
| | | | 386/278 |
| 2017/0032761 A1* | 2/2017 | Ju | H04N 19/66 |
| 2019/0174160 A1* | 6/2019 | Hamon | H04N 21/23476 |
| 2019/0273910 A1* | 9/2019 | Malaika | A63F 13/25 |
| 2019/0318106 A1* | 10/2019 | Yu | G08B 13/196 |

FOREIGN PATENT DOCUMENTS

| | | |
|---|---|---|
| JP | 2019008199 A | 1/2019 |
| JP | 2019028368 A | 2/2019 |
| WO | 2012/077392 A1 | 6/2012 |

\* cited by examiner

IMAGE PROCESSING SYSTEM, IMAGE PROCESSING INTEGRATED CIRCUIT, AND IMAGE PROCESSING METHOD

TECHNICAL FIELD

The present invention relates to an image processing system, an image processing integrated circuit, and an image processing method that perform content processing including image display.

BACKGROUND ART

Improvements in information processing techniques and image display techniques in recent years have made it possible to experience a video world in various forms. For example, a panoramic video is displayed on a head-mounted display, and an image corresponding to the user's gaze is displayed. This makes it possible to increase the sense of immersion in the video world and improve the operability of an application such as a game. Further, a walk-through system has also been developed that allows a user wearing a head-mounted display to virtually walk around a space displayed as a video while the user physically moves.

SUMMARY

Technical Problems

In order to improve the quality of the image experience described above, higher-resolution and higher-frame-rate images are required. However, it is not easy to achieve both an increase in the size of data to be processed and an increase in processing speed. For example, focusing on a video interface between an apparatus that generates and reproduces an image and a display apparatus, expanding the bit width or increasing the bit rate makes it possible to transmit large-size data at high speed. However, this poses a problem of an increase in power consumption and electromagnetic noise. Further, there is also a limit to routing of traces and cables in the board.

Further, in general, a data transmission path from image generation to image display may, in some cases, include a plurality of interfaces with different transfer protocols and electrical standards. For example, in a case where an image generation apparatus is provided separately from a head-mounted display, it is necessary to secure a communication path long enough to cover the user's range of motion. Therefore, it is necessary to suppress the bit width compared to the data transmission path inside the head-mounted display, resulting in the need to transmit data at a higher bit rate. In such a manner, there is a need to stably transmit high-resolution image data at a high frame rate while suppressing an influence on the power consumption, electromagnetic noise, and the like under the constraints imposed by the characteristics required for each interface.

The present invention has been made in view of the problems described above. It is an object of the present invention to provide a technique that can stably transmit high-quality image data using a transmission path that includes a plurality of interfaces with different protocols.

Solution to Problems

In order to solve the problems described above, one aspect of the present invention relates to an image processing system. This image processing system includes a compression section configured to compress data of an image to be transmitted through a first interface, a relay section configured to relay transmission of the data of the image from the first interface to a second interface with a different protocol, and a display section configured to display the data of the image transmitted through the second interface, in which the relay section relays the data of the image without decompressing the data of the image, and the display section decompresses and displays the data of the image.

Another aspect of the present invention relates to an image processing integrated circuit. This image processing integrated circuit includes an image data acquisition section configured to acquire data of an image that has been compressed and transmitted through a first interface, and a relay section configured to transmit the data of the image to a display panel through a second interface whose protocol is different from a protocol of the first interface, in which the relay section transmits the data of the image without decompressing the data of the image.

Yet another aspect of the present invention relates to an image processing method. This image processing method includes a step of compressing data of an image to be transmitted through a first interface, a step of relaying transmission of the data of the image from the first interface to a second interface with a different protocol, and a step of displaying the data of the image transmitted through the second interface, in which the step of relaying relays the data of the image without decompressing the data of the image, and the step of displaying decompresses and displays the data of the image.

It is noted that any combinations of the constituent components described above and the expressions of the present invention that are converted between a method, an apparatus, a system, a computer program, data structure, a recording medium, and the like are also effective as aspects of the present invention.

Advantageous Effects of Invention

According to the present invention, high-quality image data can be stably transmitted using a transmission path that includes a plurality of interfaces with different protocols.

DESCRIPTION OF EMBODIMENT

Figure 1:
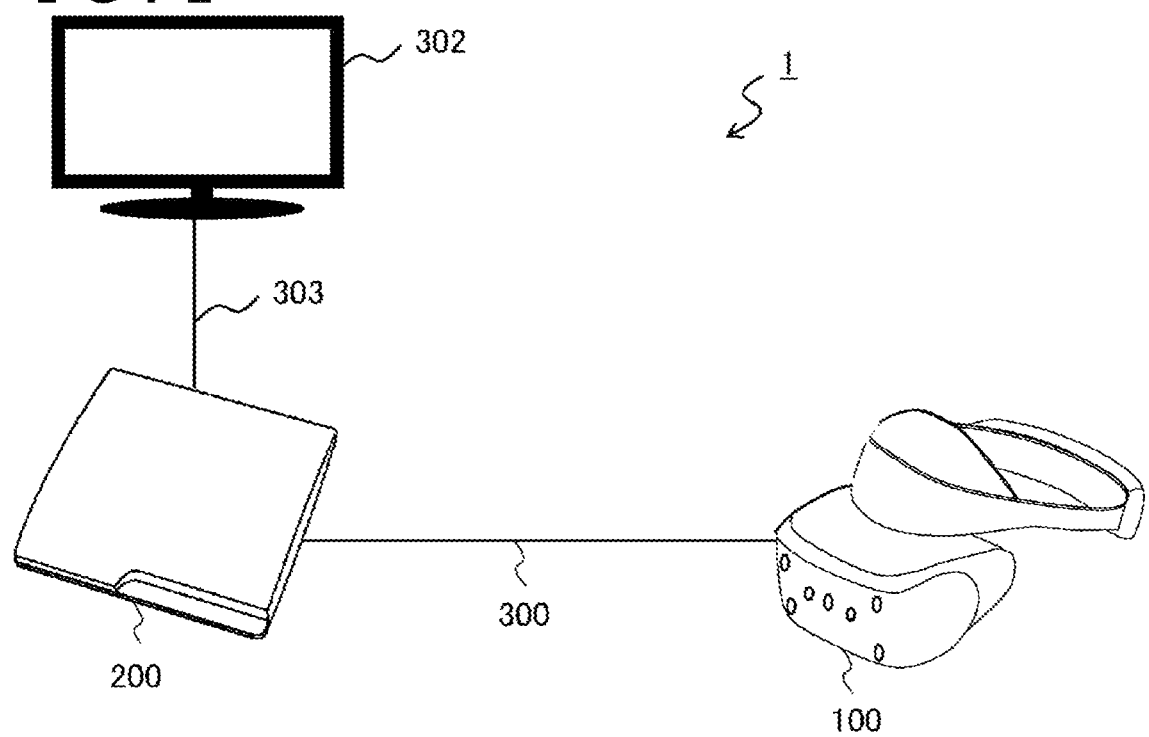
FIG. 1 is a diagram illustrating an example of a configuration of a content processing system according to the present embodiment.

FIG. 1 illustrates an example of a configuration of a content processing system according to the present embodiment. This content processing system 1 includes a content processing apparatus 200, a head-mounted display 100, and a flat panel display 302. The content processing apparatus 200 and the head-mounted display 100 are connected to each other through an interface 300 while the content processing apparatus 200 and the flat panel display 302 are connected to each other through an interface 303. The interfaces 300 and 303 perform wireless communication or connect peripheral devices such as universal serial bus (USB) Type-C.

The content processing apparatus 200 may be further connected to a server through a network. In this case, the server may provide the content processing apparatus 200 with an online application, such as a game, in which a plurality of users can participate through the network. The content processing apparatus 200 basically processes a program of content, generates a display image, and transmits the display image to the head-mounted display 100 or the flat panel display 302.

In one aspect, the content processing apparatus 200 identifies the position of the viewpoint and the gaze direction on the basis of the position and posture of the head of the user wearing the head-mounted display 100, and generates a display image of the corresponding field of view at a predetermined rate. The head-mounted display 100 and the flat panel display 302 receive the data of the display image and display the data as an image of content. In this regard, the purpose of displaying an image is not particularly limited.

For example, the content processing apparatus 200 may generate a virtual world, which is a stage of a game, as a display image while progressing the electronic game or may display a still image or a moving image for the purpose of appreciation or information provision regardless of whether the display image depicts a virtual world or a real world. However, the configuration of the content processing system in the present embodiment is not limited to the one illustrated in the figure. For example, the content processing apparatus 200 may be connected to either one of the head-mounted display 100 and the flat panel display 302 or may be connected to a plurality of head-mounted displays 100 or a plurality of flat panel displays 302.

Further, the functions of the content processing apparatus 200 may be provided in a server that is connected to the head-mounted display 100 or the flat panel display 302 through the network such as the Internet. Alternatively, the functions of the content processing apparatus 200 may be provided inside the head-mounted display 100 or the flat panel display 302. It is to be understood by those skilled in the art that the protocols of the interfaces 300 and 303 may vary as appropriate according to these connection modes.

In such a manner, the configuration of the content processing system in the present embodiment is not particularly limited and is applicable to any configuration in which data is transmitted through a plurality of interfaces with different protocols. As a representative example, the following describes a system including the content processing apparatus 200, which transmits data including an image of content, and the head-mounted display 100, which displays the image.

Figure 2:
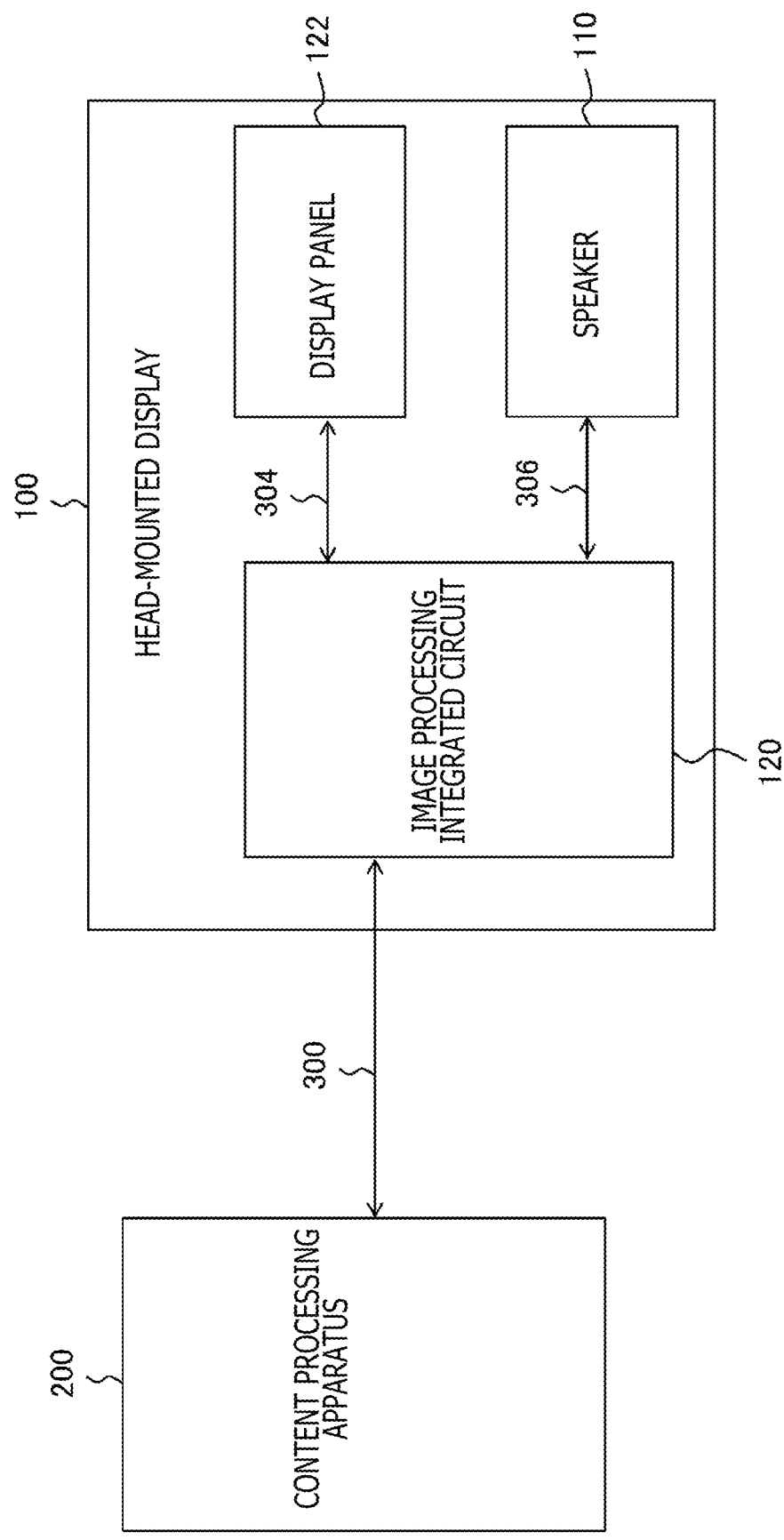
FIG. 2 is a diagram schematically illustrating a data path in the content processing system according to the present embodiment.

FIG. 2 schematically illustrates a data path in the content processing system according to the present embodiment. The head-mounted display 100 includes a display panel 122, a speaker 110, and an image processing integrated circuit 120. The display panel 122 displays an image in front of the user's eyes. The speaker 110 delivers sound to the user's ears. The image processing integrated circuit 120 is a system-on-a-chip in which various function modules including a central processing unit (CPU) are mounted. It is noted that although not illustrated herein, the head-mounted display 100 may additionally include a single-lens camera or a multi-lens camera, various motion sensors, and the like. The single-lens camera or a multi-lens camera captures a video in a field of view corresponding to the orientation of the user's face. Various motion sensors detect the movement of the user's head.

The display panel 122 is a panel having a general display mechanism, such as a liquid-crystal display or an organic electroluminescence (EL) display, and processes an image signal input from the image processing integrated circuit 120 as appropriate and outputs the image signal as an image. The speaker 110 is a general sound apparatus, such as a headphone or earphones, which process a sound signal input from the image processing integrated circuit 120 as appropriate and outputs the sound signal as sound. It is noted that the speaker 110 may have a function of a microphone that converts a voice uttered by the user into a signal and inputs the signal into the image processing integrated circuit 120.

In such a configuration, consider that data of a high-resolution and high-frame-rate image is transmitted from the content processing apparatus 200 to the head-mounted display 100 for display. At this time, the interface 300 between the content processing apparatus 200 and the head-mounted display 100 needs to support sufficient length that can cover the user's range of motion regardless of whether communication is performed wiredly or wirelessly. For example, assume a case where the data is transmitted through a cable. In this case, if the bit width is large, the cable becomes thick and is difficult to handle.

In order to guarantee the data transmission over a long distance without interfering with the mobility of the user, it is necessary to suppress the bit width and consequently increase the bit rate in the interface 300. Further, the protocol of the interface 300 needs to be capable of simultaneously transmitting sound data and the like. Moreover, in order to secure a distance of at least several meters, transmission with a relatively large power profile is required, taking into account losses in the transmission path.

On the other hand, an interface 304 between the image processing integrated circuit 120 and the display panel 122 inside the head-mounted display 100 can be connected over a short distance with a large bit width. This makes it possible to suppress the bit rate. Further, since sound data is handled by an interface 306 between the speaker 110 and the image processing integrated circuit 120, the protocol of the interface 304 can be an interface dedicated to image data. Moreover, in general, a short-distance connection using a printed circuit board and a flexible cable enables transfer with a low power profile on the assumption of low losses in the path.

In such a data transmission path, if an attempt is made to support a higher-resolution and higher-frame-rate image only by expanding the bit width or increasing the bit rate, problems such as an increase in power consumption and electromagnetic noise and difficulty in routing cables and traces are likely to become apparent. Moreover, as described above, the allowable values of the bit width and the bit rate vary depending on the interface. Therefore, it is conceivable to reduce the amount of data by compressing the data to be transmitted, along with the measures against them.

In a case where a lossless compression method is employed here, deterioration of image quality can be avoided. However, since the data size after compression generally varies depending on the contents of the image, there is no guarantee that a series of frame data that makes up the video is always transmitted stably under the same conditions. For example, if the data rate after compression exceeds the range that the interface can handle, there is a possibility that missing frames or the like may occur. In a case where a lossy compression method is employed, the data size can be suppressed to a predetermined value or lower, thereby stabilizing transmission. However, since the image quality deteriorates, repeating the processing of performing decompression and performing another compression each time the data passes through each interface further deteriorates the image quality. Further, the time required for the processing of compression and decompression may cause data delays.

Therefore, in the present embodiment, image data is compressed in a lossy manner in the content processing apparatus 200, which is a transmission source, to reduce the size of the data to be transmitted as much as possible, and the decompression of the data is performed only immediately before the data is displayed on the display panel 122. That is, when the data is transmitted between different protocols, the image processing integrated circuit 120 does not decompress or newly compress the data. This minimizes the deterioration of image quality even with lossy compression and enables high-speed transmission with reduced data size while achieving both low power consumption and high-quality image display.

Figure 3:
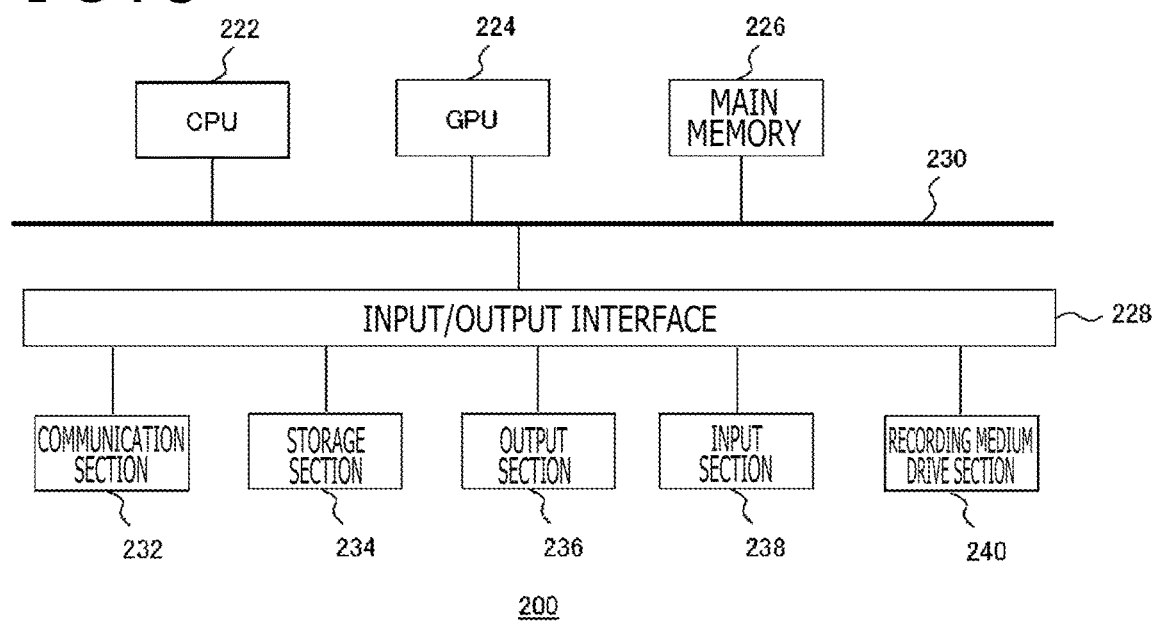
FIG. 3 is a diagram illustrating a configuration of an internal circuit of a content processing apparatus according to the present embodiment.

FIG. 3 illustrates a configuration of an internal circuit of the content processing apparatus 200. The content processing apparatus 200 includes a CPU 222, a graphics processing unit (GPU) 224, and a main memory 226. Each of these units is connected to each other through a bus 230. An input/output interface 228 is further connected to the bus 230.

A communication section 232, a storage section 234, an output section 236, an input section 238, and a recording medium drive section 240 are connected to the input/output interface 228. The communication section 232 includes a peripheral device interface such as a USB or peripheral component interconnect express (PCIe) and a network interface of a wired or wireless local area network (LAN). The storage section 234 includes a hard disk drive, a nonvolatile memory, and the like. The output section 236 outputs data to the head-mounted display 100 and the flat panel display 302. The input section 238 receives data from the head-mounted display 100 and the like. The recording medium drive section 240 drives a magnetic disk and a removable recording medium such as an optical disc or a semiconductor memory.

The CPU 222 controls the entire content processing apparatus 200 by executing an operating system stored in the storage section 234. The CPU 222 also executes various programs read from a removable recording medium and loaded into the main memory 226 or downloaded through the communication section 232. The GPU 224 has functions of a geometry engine and a rendering processor, performs rendering processing according to rendering instructions received from the CPU 222, and outputs the result to the output section 236. The main memory 226 includes a random access memory (RAM) and stores programs and data necessary for processing.

Figure 4:
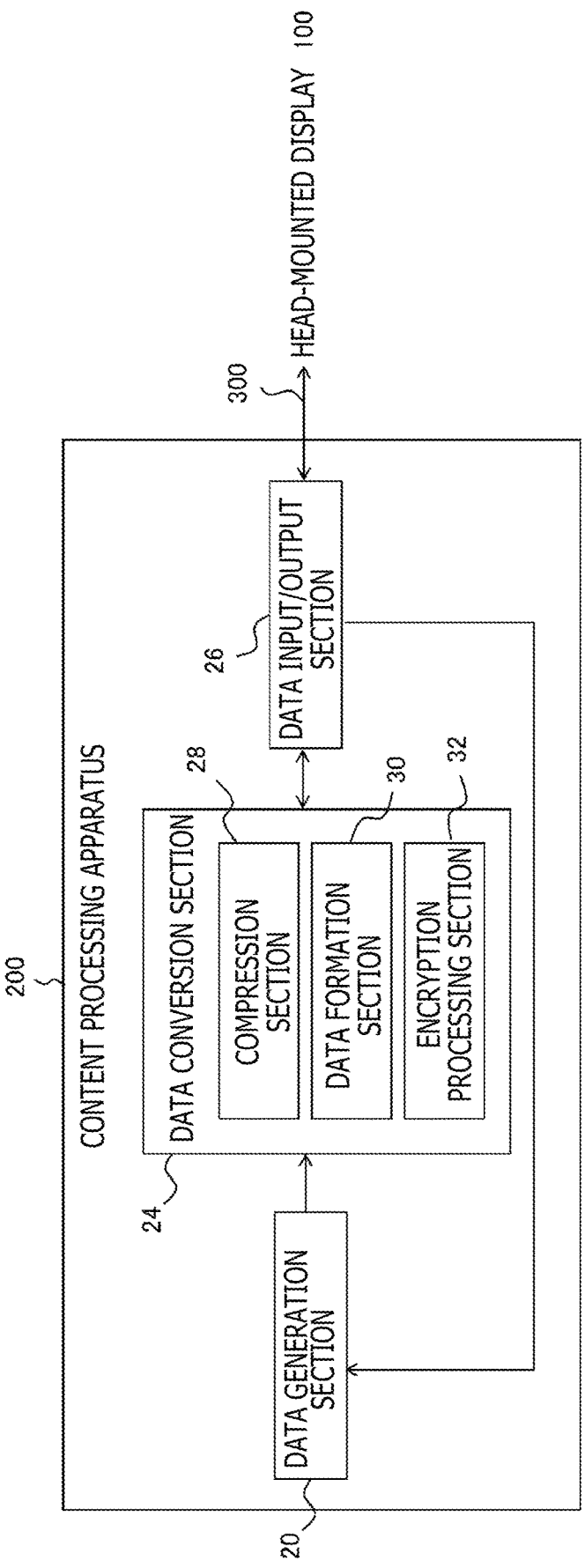
FIG. 4 is a diagram illustrating a configuration of functional blocks of the content processing apparatus according to the present embodiment.

FIG. 4 illustrates a configuration of functional blocks of the content processing apparatus 200. The functional blocks illustrated in this figure and FIG. 5 to be described later can be implemented as hardware by configurations such as a CPU, a GPU, a microcontroller, a hard-wired block, and various memories, and are implemented as software by programs that implement various functions such as a data input function, a data retaining function, an image processing function, and a communication function and are loaded into a memory from a recording medium or the like. Therefore, it is to be understood by those skilled in the art that these functional blocks can be implemented in various forms by hardware only, software only, or a combination of hardware and software and are not limited to any of these forms.

Further, although only the functional blocks used to implement the present embodiment are illustrated in this figure and FIG. 5 to be described later, it is to be understood by those skilled in the art that other functional blocks can be provided in various ways as necessary. The content processing apparatus 200 illustrated in the figure includes a data generation section 20, a data conversion section 24, and a data input/output section 26. The data generation section 20 generates data of content to be output. The data conversion section 24 converts the data of the content into an output format. The data input/output section 26 transmits and receives data to and from the head-mounted display 100.

The data generation section 20 generates an image and sound data to be presented to the user as content. The data generation section 20, for example, progresses the game in response to the user operations on an input apparatus, not illustrated, the movement of the user's head, and the like, and generates a corresponding display image and sound at a predetermined rate. Alternatively, the data generation section 20 generates, at a predetermined rate, an image of a region to be displayed in a panoramic image so as to correspond to the field of view corresponding to the movement of the user's head. For this purpose, the data generation section 20 internally retains, for example, model data of an object to appear in the image, video data to be displayed, and a frame buffer that temporarily stores the image rendered.

The data conversion section 24 performs processing on the data of the content generated by the data generation section 20. This processing is necessary to output the data to the head-mounted display 100. In detail, the data conversion section 24 includes a compression section 28, a data formation section 30, and an encryption processing section 32. The compression section 28 compresses the data of the content by using a predetermined method to reduce the size of the data to be transmitted. In particular, the compression section 28 compresses the data of the image in a lossy manner so that the data size per unit area after compression becomes equal to or less than a certain value regardless of the contents of the image.

Here, the compression section 28 compresses data in units of a region of a predetermined size that is smaller than the entire image of one frame by using a compression method such as entropy encoding or index scalar encoding, so that the head-mounted display 100 can decode and decompress the data in the same units of the region. Hereinafter, the region used as a unit when the compression section 28 compresses an image will be referred to as a "compression unit region." The size of the compression unit region is determined through handshaking with the head-mounted display 100 on the basis of a display method or the like of the display panel 122.

The data formation section 30 sequentially connects the data of sound and the data of the image in a predetermined format to form output data. Here, as described above, at least the data of the image has been compressed in a lossy manner on a compression unit region basis by the compression section 28. Then, the data formation section 30 connects the compressed data of each compression unit region to each other in raster order on the image plane and then in frame order to form stream data. At this time, sound data may be further connected so as to synchronize with a blanking period between frames.

The encryption processing section 32 encrypts the data to be output by using a predetermined algorithm such as a public key system. Data necessary for encryption such as a public key and the like are acquired from the head-mounted display 100. The data input/output section 26 streams and transfers the data of the content that has been converted into the output format and then encrypted by the data conversion section 24 to the head-mounted display 100 through the interface 300. At this time, the data input/output section 26 may packetize the data in a format suitable for the interface 300 before transmitting the data.

Further, the data input/output section 26 also acquires the data necessary for each processing performed by the data generation section 20 and the data conversion section 24 from the head-mounted display 100 through the interface 300. Here, "necessary data" may include, for example, an image captured by a camera included in the head-mounted display, measurement values acquired by various sensors, and other information such as a display method that determines the size of the compression unit region.

Moreover, the data input/output section 26 transmits information relating to a clock and phase that determine a timing at which image data is transmitted through the interface 300 to the head-mounted display 100 through the interface 300. For example, the data input/output section 26 transmits at least one of a pixel clock, a horizontal synchronization signal (H-sync), a vertical synchronization signal (V-sync), and the like. On the basis of this information, the head-mounted display 100 adjusts a clock that determines a timing at which the image is displayed and synchronizes the transmission of the data from the content processing apparatus 200 with the display in the head-mounted display 100.

Figure 5:
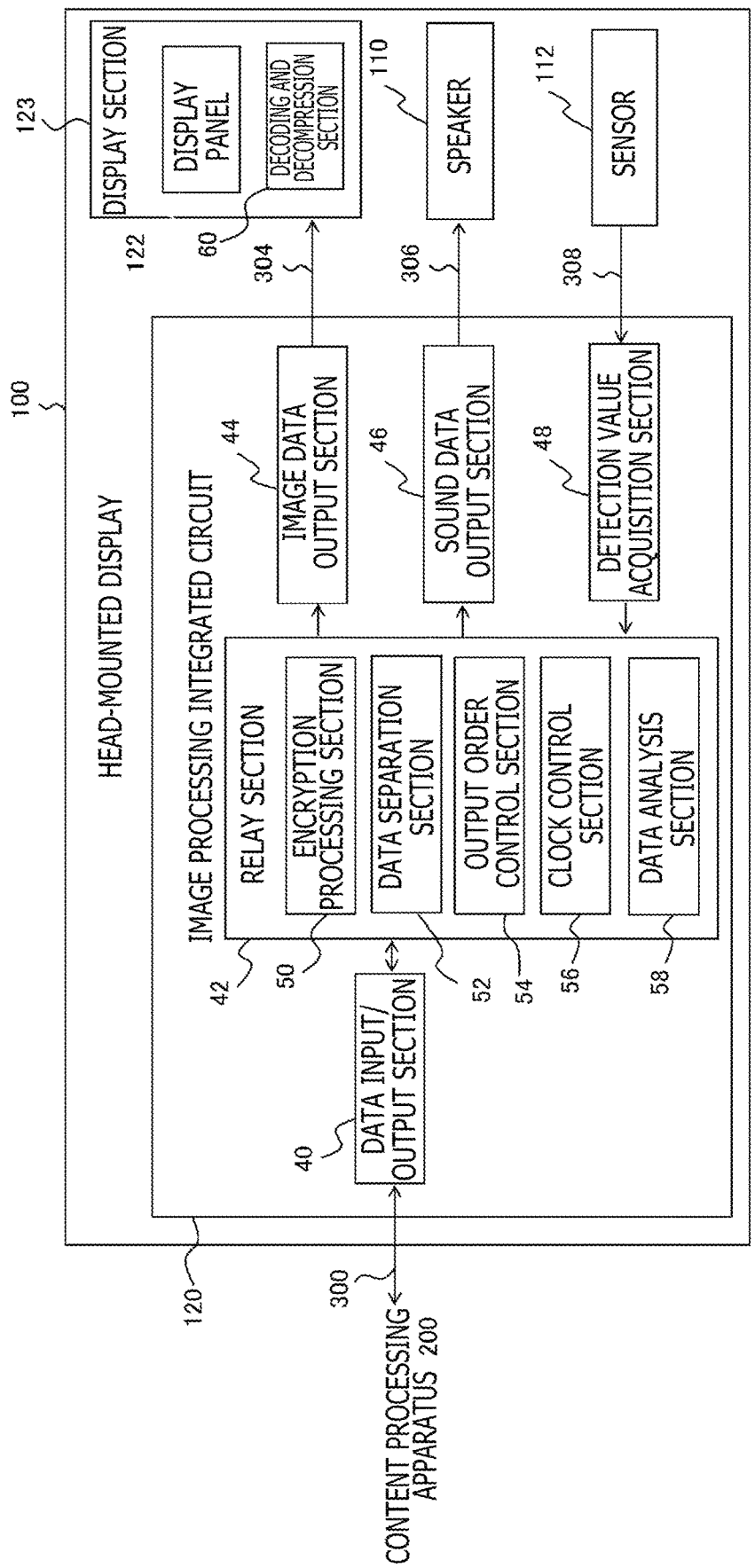
FIG. 5 is a diagram illustrating a configuration of functional blocks of a head-mounted display according to the present embodiment.

FIG. 5 illustrates a configuration of functional blocks of the head-mounted display 100. As described above, the head-mounted display 100 includes a sensor 112 in addition to the image processing integrated circuit 120, a display section 123 including the display panel 122, and the speaker 110. The sensor 112 includes a motion sensor, a camera, and the like. In the present embodiment, the image processing integrated circuit 120 sequentially outputs the data of the image transmitted from the content processing apparatus 200 to the display panel 122 without waiting for reception of data for one frame. Therefore, even in a case where a buffer memory (not illustrated) is provided to temporarily store the data of the image, its capacity can be smaller than the data size of one frame.

The image processing integrated circuit 120 includes a data input/output section 40, a relay section 42, an image data output section 44, a sound data output section 46, and a detection value acquisition section 48. The data input/output section 40 transmits and receives data to and from the content processing apparatus 200. The relay section 42 performs relay between interfaces with different protocols. The image data output section 44 outputs data of an image out of data of content. The sound data output section 46 outputs data of sound. The detection value acquisition section 48 acquires detection values from the sensor 112.

The data input/output section 40 serves as an image data acquisition section and acquires the data of the content transmitted from the content processing apparatus 200 through the interface 300. At this time, the data input/output section 40 also acquires information relating to a clock used for transmission of image data in the content processing apparatus 200. Further, the data input/output section 40 transmits data of a captured image acquired by the sensor 112 and measurement values of the motion sensor and the like to the content processing apparatus 200 through the interface 300.

The relay section 42 relays transmission of data between the interface 300, which is the interface (first interface) with the content processing apparatus 200, and interfaces 304, 306, and 308, which are interfaces (second interfaces) with the display section 123, the speaker 110, and the sensor 112, respectively, inside the head-mounted display 100. Examples of the interface 300, which is the interface with the content processing apparatus 200, include USB Type-C, DisplayPort, high-definition multimedia interface (HDMI) 2.1 (registered trademark), and the like.

Examples of the interface 304, which is the interface with the display section 123, include a mean interpotential interval (MIPI) display serial interface (DSI). Examples of the interface 306, which is the interface with the speaker 110, include inter-IC sound (I2S). Examples of the interface 308, which is the interface with the sensor 112, include MIPI camera serial interface (CSI), MIPI inter-integrated circuit (I2C), improved inter-integrated circuit (I3C), and the like. Depending on the system configuration, as described above, the interface 300 may be a wide area network such as the Internet or a LAN or may be an on-chip bus inside the image processing integrated circuit 120.

In general, data that has been compressed and encoded at the transmission source is transmitted through the interface. Subsequently, the data is decoded and decompressed at the transmission destination first, before the data is subjected to further processing or is further transmitted. Here, in a case where the data is to be further transmitted through another interface, it may be, in some cases, necessary to newly compress and encode the data because the protocol and payload formats are different. On the other hand, as described above, the relay section 42 according to the present embodiment relays the data of the image, which has been compressed and encoded by the content processing apparatus 200, without decoding and decompressing the data of the image. This avoids the deterioration of image quality due to lossy compression that would otherwise be performed multiple times, and, at the same time, minimizes the processing that needs to be performed at the time of relaying.

In order to realize smooth relaying of data and image display, the content processing apparatus 200 forms transmission data in a format suitable for the characteristics of the head-mounted display 100, which is the data transmission destination. For this purpose, the relay section 42 determines the format of the transmission data through handshaking when, for example, the head-mounted display 100 and the content processing apparatus 200 are connected to each other. Specifically, the relay section 42 determines at least one of an image display method, an image resolution, a frame rate, a pixel format, a pixel clock operation frequency, timings of the horizontal synchronization signal (H-sync) and the vertical synchronization signal (V-sync), the size of the compression unit region, a compression method, the compression data length (compression ratio), a stream data configuration that can be supported by the first and second interfaces, presence or absence of sound data, presence or absence of encryption, a public key, and the like, which are based on the configurations of the display panel 122 and the relay section 42.

For example, assume a case where the display panel 122 has a display method under which the display panel 122 can be driven per each of unit regions independently. The unit regions are obtained by dividing the screen. In this case, the content processing apparatus 200 is also notified of the size of the unit region (hereinafter referred to as a "display unit region"). In response, the content processing apparatus 200 defines the display unit regions or regions obtained by dividing the display unit regions as the compression unit regions and compresses the data, thereby preventing the data in each compression unit from straddling a plurality of display unit regions. Accordingly, individual display unit regions can be independently subjected to display processing.

It is noted that the head-mounted display 100 and the content processing apparatus 200 may also determine the pixel format, that is, the color space representing pixels such as RGB, YUV444, YUV422, or YUV420, a format, color depth, and the like. The relay section 42 includes an encryption processing section 50, a data separation section 52, an output order control section 54, a clock control section 56, and a data analysis section 58. In a case where the data of the content acquired by the data input/output section 40 has been encrypted, the encryption processing section 50 decrypts the data. Whether or not to encrypt the data to be transmitted can be controlled interface by interface independently. Accordingly, the presence or absence of encryption can be optimized according to the confidentiality each interface inherently has.

For example, data transmission between the content processing apparatus 200 and the head-mounted display 100 is inherently less confidential than data transmission within the head-mounted display 100. Therefore, the data is encrypted at the time of transmission through the interface 300 and is decrypted when the head-mounted display 100 has acquired the data, so that necessary and sufficient confidentiality can be maintained. However, there is no particular limitation to which interface actually encrypts the data.

The data separation section 52 separates a series of pieces of content data into a header, image data, and sound data. In a case where information relating to a clock is acquired simultaneously, this information is also separated. The output order control section 54 arranges the pieces of data of the image, which is an array of pieces of data in each compression unit, in the order suitable for the display order on the display panel 122. At this time, each compressed data itself is not decoded or decompressed, but is reordered or branched into a plurality of streams as necessary.

In a case of the display panel 122 under such a method that the display panel 122 is driven per display unit region as described above, the data in each compression unit is distributed to the corresponding display unit region. By making the unit of the compression unit region the same as the unit of the display unit region or the same as the unit further divided therefrom, the data can be appropriately distributed while the data remains compressed.

The clock control section 56 adjusts a clock to synchronize the generation and output of the content data in the content processing apparatus 200 with the output of the content data in the head-mounted display 100. Specifically, the clock control section 56 detects the clock phase and frequency of the content processing apparatus 200 and adjusts the clock frequency and clock phase inside the head-mounted display 100 to suppress the difference between them to a predetermined value or lower.

Such a configuration enables the head-mounted display 100 to output the sequentially acquired data streams without fail with less time adjustment. As a result, even in a case where the data of the content is temporarily stored inside the head-mounted display 100, the buffer memory can be of minimum size.

The data analysis section 58 analyzes the data of the content and determines control information for controlling the display panel 122 and the speaker 110 such that the data of the content is output under appropriate conditions. For this purpose, the data analysis section 58 may decode and decompress the image data before performing image analysis. In a case where a liquid-crystal panel is employed as the display panel 122, a higher resolution can be achieved, but the dynamic range is insufficient and the response speed is low. In a case where an organic EL panel is employed, the response speed is high, but it is difficult to achieve a higher resolution and, moreover, a phenomenon called Black Smearing may occur in some cases. Black Smearing is a phenomenon in which color blurring occurs in and around a black region. The data analysis section 58 may make corrections so as to eliminate such various adverse effects caused by the display panel.

For example, a dark scene or region in the liquid-crystal panel is identified through image analysis. In order to improve the dynamic range in the corresponding frame or region, control information for, for example, reducing the luminance of the backlight of the liquid-crystal panel constituting the display panel 122 is determined. For example, a scene or region of intense motion in the liquid-crystal panel is identified through image analysis. Inserting a black image between the corresponding frames can reset the liquid crystal and improve the response speed.

For example, in a case of the organic EL panel, a black region and a region around the black region in which Black Smearing is likely to occur is identified through image analysis. Applying an offset to a luminance value or a gamma value for gamma correction makes color blurring less outstanding. Additionally, the voltage, color gamut, and the like that determine the display luminance can also be controlled. The processing based on these pieces of control information may be performed in any of the display section 123, the speaker 110, and the image processing integrated circuit 120.

Decoding and decompression and analysis of the image data by the data analysis section 58 are performed independently of the transmission of the image data to the display section 123. That is, the data of the image to be displayed on the display panel 122 is relayed in a compressed state, while the image analysis in the data analysis section 58 is performed separately. Since the output from the data analysis section 58 is limited to the control information for controlling the display panel 122 and the speaker 110, the transmission path is not overwhelmed, and the output rates of the image and sound are not affected. It is noted that the data analysis section 58 may be provided in the display section 123.

The image data output section 44 outputs the compressed data of the image, the output order of which has been appropriately optimized by the output order control section 54, to the display section 123 through the interface 304. The sound data output section 46 outputs the sound data separated by the data separation section 52 to the speaker 110 through the interface 306. In a case where the data analysis section 58 generates control information for controlling the display panel 122 and the speaker 110, the image data output section 44 and the sound data output section 46 also transmit such information to the display section 123 and the speaker 110, respectively. It is noted that, in order to transmit the control information, the data analysis section 58 may be connected to the display section 123 and the speaker 110 through a dedicated transmission path, not illustrated.

The detection value acquisition section 48 acquires detection values from the sensor 112 through the interface 308 and outputs the detection values to the relay section 42. Here, the detection values include a measurement value of the motion sensor, an image captured by the camera, and the like. The relay section 42 transmits these pieces of data to the content processing apparatus 200 through the data input/output section 40 and the interface 300 as needed.

The display section 123 includes the display panel 122 and a decoding and decompression section 60. The display panel 122 includes a matrix of display elements for displaying image data and a control section for driving the matrix of display elements. The decoding and decompression section 60 decodes and decompresses image data in the compressed state acquired from the image processing integrated circuit 120. In a case where the display panel 122 has a method under which the display panel 122 is driven per predetermined display unit region as described above, the decoding and decompression section 60 may be provided for each of the display unit regions independently so that decoding and decompression can be performed in parallel.

In any case, decoding and decompressing the image data immediately before display can minimize deterioration of image quality even with lossy compression and easily achieve high-speed data transmission at all interfaces. It is noted that, in a case where the data analysis section 58 is provided in the display section 123, the data analysis section 58 can analyze the image that has been decoded and decompressed by the decoding and decompression section 60. On the basis of the control information determined by the data analysis section 58, the display panel 122 and the speaker 110 adjust the display and sound output settings appropriately.

Figure 6:
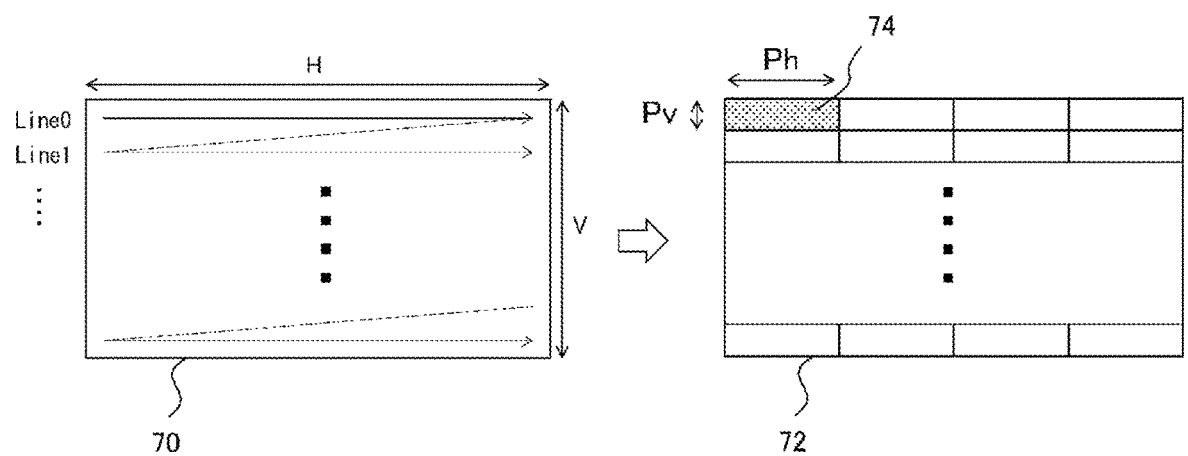
FIG. 6 is a diagram for describing a change in image data in the content processing apparatus according to the present embodiment.

FIG. 6 is a diagram for describing a change in image data in the content processing apparatus 200. First, the data generation section 20 of the content processing apparatus 200 renders an image for one frame in an internal frame buffer 70. The illustrated frame buffer 70 represents an image plane as a rectangle and stores, for example, data of pixel values of the size H in the horizontal direction=3840 pixels and the size V in the vertical direction=2160 pixels.

The data generation section 20 generates an image for one frame by storing data of pixels in the frame buffer 70 in raster order in which scanning from left to right is repeated downward in the first line (Line0), the second line (Line1), . . . , as indicated by the arrow. The compression section 28 of the content processing apparatus 200 sequentially reads the data of the image from the frame buffer 70 to generate compressed and encoded image data 72.

At this time, the compression section 28 performs lossy compression on a predetermined compression unit region basis, as described above, so that when decoding and decompression are performed, processing can be performed in the same units of region independently. The illustrated image data 72 depicts a block of each compression unit region on the image plane. In this example, the compression unit regions (e.g., compression unit regions 74) are regions obtained by dividing the length of a region of one line of the image plane into four equal regions. That is, the width Ph of the compression unit region=H/4 (pixels) and the height Pv thereof=1 (pixel). However, the size Ph×Pv of the compression unit region is not limited and is optimized on the basis of the display method, the resolution, and the frame rate of the display panel 122, the characteristics of each interface, the compression method, and the like.

It is noted that the illustrated image data 72 merely depicts an example of settings of the compression unit regions on the image plane, and it is not intended to form compressed image data as illustrated in the figure. That is, in practice, each time the data of pixels constituting each compression unit region is stored in the frame buffer 70, the compression section 28 compresses and encodes the data and sequentially outputs the data. As a result, the data of the image that has been compressed and encoded is output in raster order of the compression unit regions on the image plane.

Figure 7:
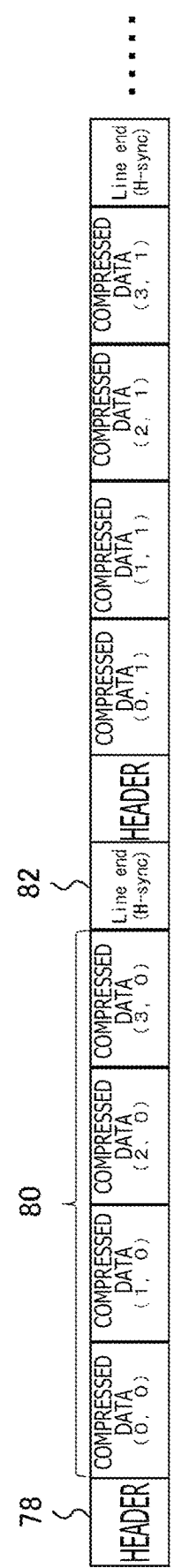
FIG. 7 is a diagram illustrating an example of the structure of data to be transmitted by a data input/output section of the content processing apparatus through an interface in the present embodiment.

FIG. 7 illustrates an example of the structure of data to be transmitted by the data input/output section 26 of the content processing apparatus 200 through the interface 300. In the example illustrated in the figure, transmission data 76 has a stream structure in which header information 78, compressed data 80 of an image, and a horizontal synchronization signal 82 are concatenated per line of the compression unit regions. In this figure, each rectangle constituting the compressed data 80 represents compressed data in one unit.

Here, the numbers in each rectangle indicate the position coordinates of the corresponding compression unit region in the form of (the position in the horizontal direction, the position in the vertical direction). In this example, as illustrated in FIG. 6, the length of a region of one line of the image plane is assumed to be divided into four equal regions. Therefore, the position coordinate in the horizontal direction is any one of 0, 1, 2, and 3. With lossy compression, the data size after compression of each compression unit region can be controlled regardless of contents of the image. It is noted that, although not illustrated here, the vertical synchronization signal is included in the transmission data 76 in a vertical blanking interval from the last line of a frame to the first line of the next frame. Additionally, sound data may be included in this interval. The data input/output section 26 sequentially packetizes a series of transmission data 76 and transmits the series of transmission data 76 through the interface 300.

Figure 8:
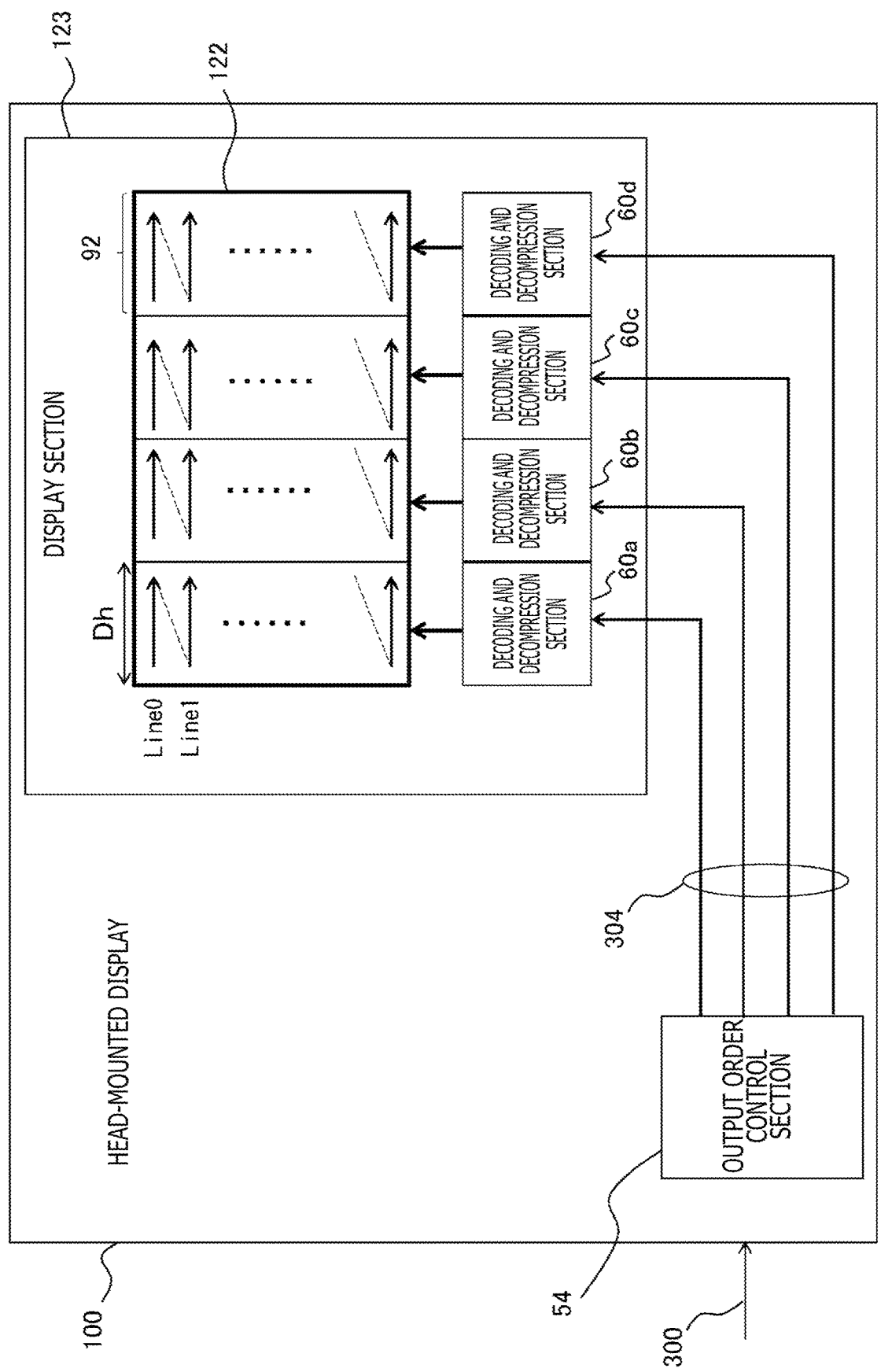
FIG. 8 is a diagram for describing a flow of image data in the head-mounted display according to the present embodiment.

FIG. 8 is a diagram for describing a flow of image data in the head-mounted display 100. The data of the content having the structure illustrated in FIG. 7 is transmitted from the content processing apparatus 200 to the head-mounted display 100 through the interface 300. The output order control section 54 of the relay section 42 acquires the compressed data of the image out of the data of the content, and performs necessary processing to adapt the data to the display section 123 and the interface 304 in between. At this time, decoding and decompression or new compression and encoding of the data are not performed.

In this example, the display panel 122 is structured such that the display panel 122 can be driven per display unit region independently. As the resolution of the image to be displayed increases, it is becoming more and more difficult to route a high-speed signal operating on the same clock to both ends of the screen. Further, the higher the resolution and frame rate become, the faster a drive circuit of the panel needs to be. Accordingly, display apparatuses in which individual regions obtained by dividing one screen can be driven independently are becoming more and more popular (refer to, for example, Japanese Patent Laid-open No. Hei 5-80714). For example, driving the pixels of a plurality of display unit regions in parallel can reduce the number of pixels that need to be scanned per unit time, thereby suppressing the speed of the drive circuit.

In the example illustrated in the figure, the display panel 122 is structured such that pixels are driven in raster order, as indicated by the arrows, per each of display unit regions (e.g., display unit regions 92) obtained by vertically dividing the screen into four equal regions. For such a display panel 122, the compression unit region is determined so as not to straddle adjacent display unit regions. This makes it possible to distribute the image data in the compressed state to the drive section of each display unit region. Moreover, the decoding and decompression processing itself can also be performed in parallel by providing decoding and decompression sections 60a, 60b, 60c, and 60d to the respective display unit regions.

That is, if the width of the display unit region is Dh, the width Ph of the compression unit region is determined so as to satisfy the following condition.

$Ph=Dh/n1$ (n1 is a natural number)

In this case, the height Pv of the compression unit region may be one pixel or a plurality of pixels. On the other hand, in a case of a display panel having display unit regions obtained by horizontally dividing the screen, if the height thereof is Dv, the height Pv of the compression unit region is determined so as to satisfy the following condition.

$Pv=Dv/n2$ (n2 is a natural number)

In this case, the width Ph of the compression unit region may be one pixel or a plurality of pixels.

In a case of a display panel having display unit regions obtained by dividing the screen both horizontally and vertically, both the width Ph and the height Pv of the compression unit region are determined so as to satisfy the above conditions. The content processing apparatus 200 and the head-mounted display 100 determine the sizes Ph and Pv of the compression unit region through prior handshaking on the basis of the size and the like of the display unit region in the display panel 122.

The output order control section 54 of the head-mounted display 100 distributes the data of each compression unit in the transmitted stream data on the basis of the correspondence between the position on the original image plane and the position of the display unit region on the screen of the display panel 122. The image data output section 44 then packetizes the distributed compressed data as appropriate and transmits each packet to the display section 123 through the interface 304, which is individually provided for each display unit region.

Each of the decoding and decompression sections 60a, 60b, 60c, and 60d of the display section 123 decodes and decompresses the acquired compressed data in parallel and supplies the result to the drive section, not illustrated, to drive the display pixels of the corresponding display unit region. In such a manner, the output order control section 54 appropriately distributes the image data so that the subsequent processing can be progressed individually and display can be performed efficiently.

Figure 9:
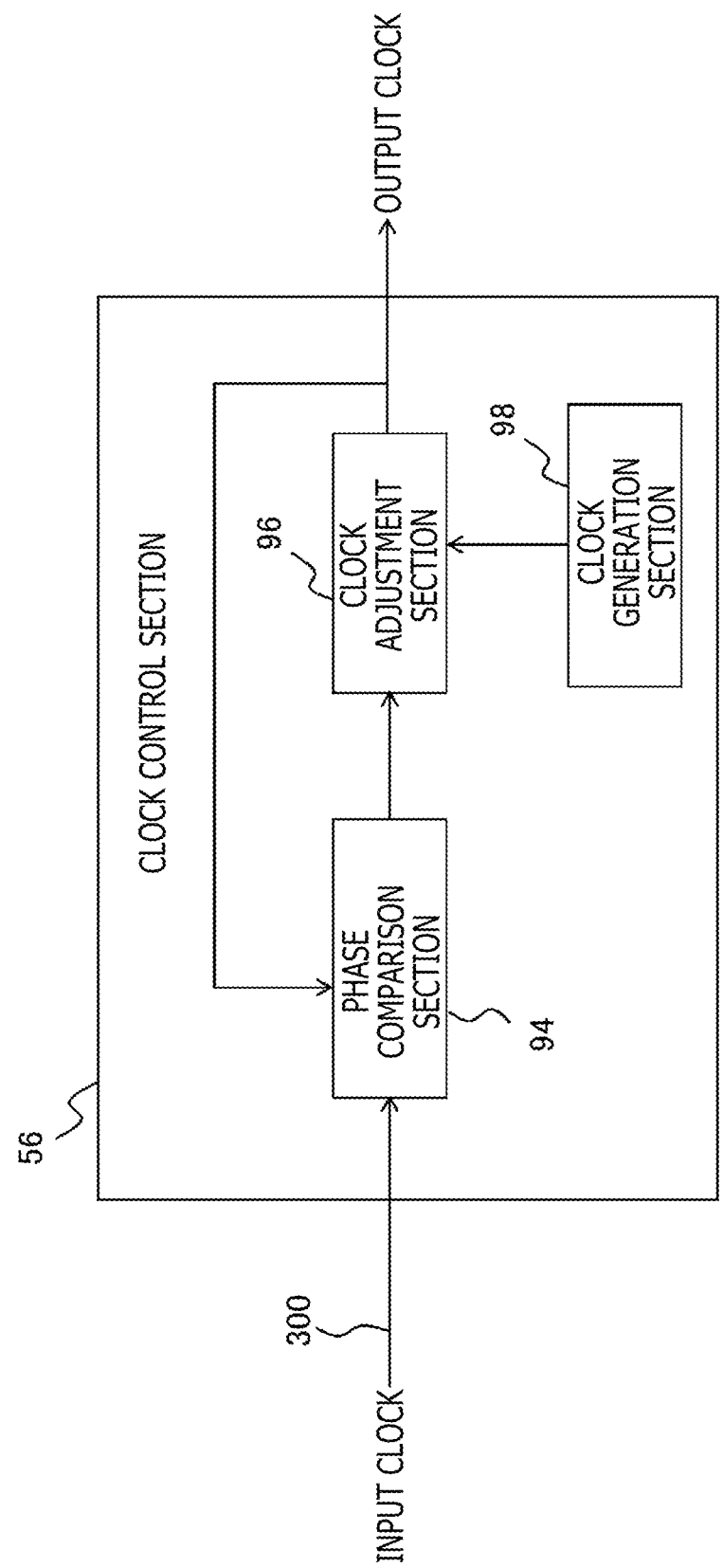
FIG. 9 is a diagram illustrating a configuration of functional blocks of a clock control section according to the present embodiment.

FIG. 9 illustrates a configuration of functional blocks of the clock control section 56. The clock control section 56 includes a clock generation section 98, a phase comparison section 94, and a clock adjustment section 96. The clock generation section 98 is the generation source of a clock that determines an operation timing in the head-mounted display 100. The phase comparison section 94 acquires, through the interface 300, data relating to a clock that determines a timing at which image data is transmitted from the content processing apparatus 200, and performs phase comparison with the clock inside the head-mounted display 100.

The comparison target is at least one of the pixel clock, the horizontal synchronization signal, and the vertical synchronization signal. In a case where the clock operation frequency differs between the content processing apparatus 200 and the head-mounted display 100, it is desirable to compare the phase difference of the horizontal synchronization signal or the vertical synchronization signal. It is noted that a clock divider, not illustrated, may be incorporated into the clock control section 56. In this case, a clock divided by the clock divider may be used by the phase comparison section 94. The clock adjustment section 96 adjusts the timing of the clock generated by the clock generation section 98 on the basis of the result of the comparison by the phase comparison section 94 and outputs the clock.

That is, the clock inside the head-mounted display 100 is adjusted such that the phase difference between the transmission from the content processing apparatus 200 through the interface 300 and the data transmission inside the head-mounted display 100 becomes a predetermined value or lower. The clock adjusted by the clock adjustment section 96 is also input into the phase comparison section 94, which compares the clock again with the clock in the interface 300. Then, on the basis of the comparison result, the clock adjustment section 96 makes further adjustments as necessary. Such feedback control can stabilize synchronization even in a case of data transmission through different interfaces.

Such a configuration can minimize the jitter of the transfer timing that occurs between both interfaces. As a result, the data of the image transmitted from the content processing apparatus 200 can reach the display without the need for significant time adjustment. This makes it possible to not only achieve display with slight delay, but also reduce the capacity of the buffer memory that temporarily stores the image data for time adjustment to smaller than one frame.

According to the present embodiment described above, the system that transmits and displays image data through the plurality of interfaces with different protocols includes the relay section that inputs data that has been compressed and encoded at the transmission source and transmitted into another interface without decoding and decompressing the data. This configuration can minimize the deterioration of image quality even with lossy compression and can significantly suppress the size of the data to be transmitted even in a case of a high-resolution and high-frame-rate image. As a result, it is possible to display a high-quality image while suppressing the influence on power consumption, electromagnetic noise, the configuration of cables and traces, and the like.

Further, at the time of initial compression and encoding, the data is generated so as to be adapted to the display method or the like of the display panel so that the compressed data can be relayed as it is without fail and can reach the display with simple processing. Moreover, in a case where the transmission source and the display destination are operating on different clocks, the relay section adjusts the clock of the display destination to minimize the phase difference. This configuration can allow the transmitted data to be output without stagnation. Accordingly, the capacity of the memory that buffers the data can be saved while the data can be output with slight delay.

The present invention has been described above on the basis of the embodiment. The embodiment is an exemplification, and it is to be understood by those skilled in the art that various modifications can be made to combinations of individual constituent components and individual processing processes in the embodiment and that such modifications also fall within the scope of the present invention.

Figure 10:
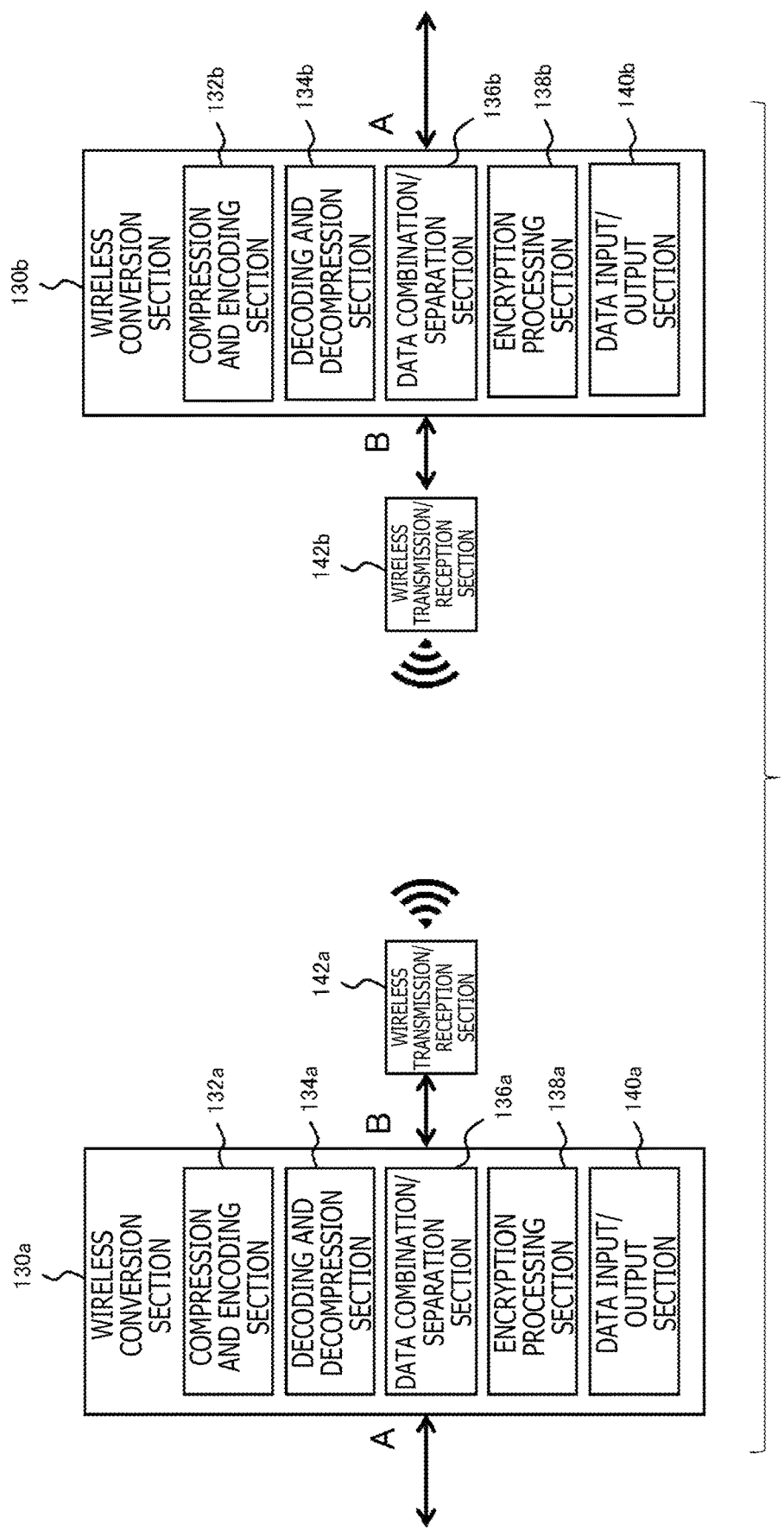
FIG. 10 is a diagram illustrating a configuration of a wireless communication interface between two apparatuses that can be applied to the present embodiment.

For example, in a case where the interface 300 between the content processing apparatus 200 and the head-mounted display 100 performs wireless communication, the configuration described below may be introduced. FIG. 10 illustrates a configuration of a wireless communication interface between the two apparatuses that can be applied to the present embodiment. An interface 310 includes a pair of a wireless conversion section 130a and a wireless transmission/reception section 142a and a pair of a wireless conversion section 130b and a wireless transmission/reception section 142b. The wireless transmission/reception section 142a and the wireless transmission/reception section 142b establish wireless communication therebetween and transmit and receive data. A conventional technique can be applied to the protocol of the communication.

The wireless conversion sections 130a and 130b perform necessary conversion processing on the data to be transmitted and received wirelessly. In detail, the wireless conversion sections 130a and 130b respectively include compression and encoding sections 132a and 132b, decoding and decompression sections 134a and 134b, data combination/separation sections 136a and 136b, encryption processing sections 138a and 138b, and data input/output sections 140a and 140b. By using a predetermined encoding method, the compression and encoding sections 132a and 132b compress and encode the data to be transmitted from the respective corresponding wireless transmission/reception sections 142a and 142b, that is, the data input from an input A in the figure.

Here, the method of the compression and encoding performed by the compression and encoding sections 132a and 132b may be the same as or different from that of the compression section 28 of the content processing apparatus 200. It is noted that, in a case of wireless data transfer, the frequency of occurrence of missing data during transfer increases compared to the case of wired data transfer. Therefore, the compression and encoding sections 132a and 132b may employ an error detection and correction method such as forward error correction (FEC). The decoding and decompression sections 134a and 134b decode and decompress the data received by the respective corresponding wireless transmission/reception sections 142a and 142b, that is, the data input from an input B in the figure. Here, the decoding and decompression sections 134a and 134b may support both the method of the compression and encoding performed by the compression section 28 of the content processing apparatus 200 and the method of the compression and encoding performed by the compression and encoding sections 132a and 132b.

In a case where this is applied to the present embodiment, data input into the input A of the wireless conversion section 130a is, for example, data of content such as an image and sound generated by the content processing apparatus 200. Further, data input into the input A of the wireless conversion section 130b is, for example, an image captured by the camera included in the head-mounted display 100, data of sound acquired by the microphone, or the result of an image analysis performed inside the head-mounted display 100.

The data combination/separation sections 136a and 136b combine different types of data to be transmitted from the respective corresponding wireless transmission/reception sections 142a and 142b or separate data received by the respective corresponding wireless transmission/reception sections 142a and 142b by type. The encryption processing sections 138a and 138b encrypt data to be transmitted from the respective corresponding wireless transmission/reception sections 142a and 142b or decrypt encrypted data received by the wireless transmission/reception sections 142a and 142b. The data input/output sections 140a and 140b are the interfaces with the respective corresponding wireless transmission/reception sections 142a and 142b.

Figure 11:
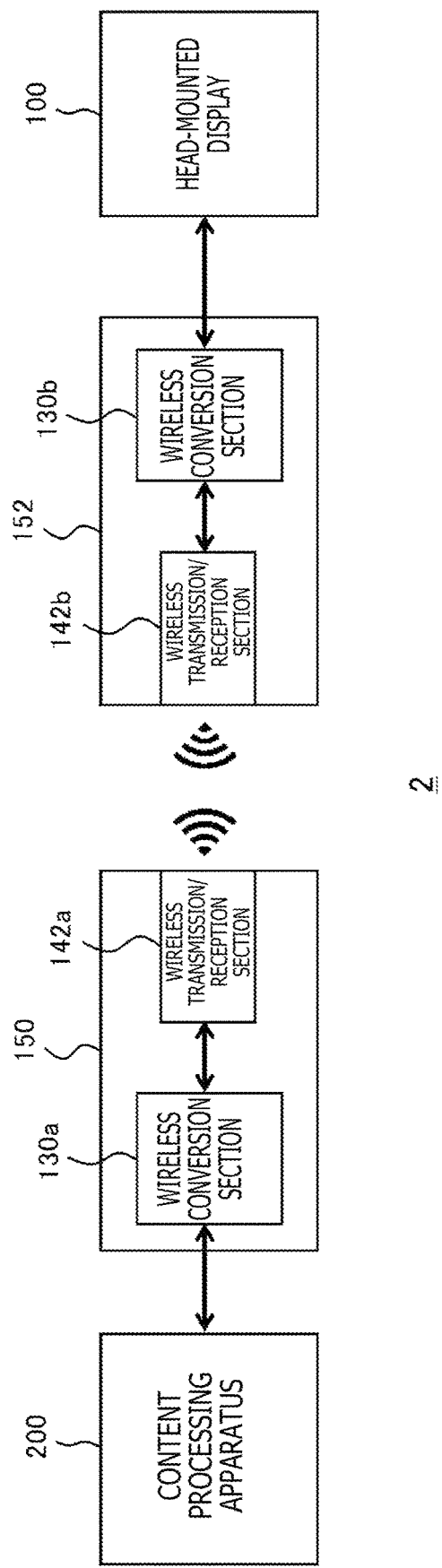
FIG. 11 is a diagram exemplifying an overall configuration of the content processing system for a case where the interface illustrated in FIG. 10 is introduced.

FIG. 11 exemplifies an overall configuration of the content processing system for a case where the interface 310 illustrated in FIG. 10 is introduced. A content processing system 2 includes a wireless connection adapter 150 for an information processing apparatus and a wireless connection adapter 152 for a display, in addition to the content processing apparatus 200 and the head-mounted display 100. The wireless connection adapter 150 for the information processing apparatus is connected to the content processing apparatus 200. The wireless connection adapter 152 for the display is connected to the head-mounted display 100. The wireless connection adapter 150 for the information processing apparatus includes the wireless conversion section 130a and the wireless transmission/reception section 142a illustrated in FIG. 10. The wireless connection adapter 152 for the display includes the wireless conversion section 130b and the wireless transmission/reception section 142b illustrated in FIG. 10.

The content processing apparatus 200 and the head-mounted display 100 may be respectively connected to the wireless connection adapter 150 for the information processing apparatus and the wireless connection adapter 152 for the display wiredly using a standard such as USB Type-C. For example, the wireless connection adapter 152 for the display is of a stationary type and is installed in the vicinity of a user wearing the head-mounted display 100. Alternatively, the wireless connection adapter 152 for the display may be of a portable type in the shape of, for example, a backpack, a shoulder bag, a waist bag, or the like and carried by the user wearing the head-mounted display 100.

Alternatively, the wireless connection adapter 152 for the display may be shaped so as to allow connector connection with the head-mounted display 100 and be connected to the relay section 42 inside the head-mounted display 100 by traces on the board. These configurations allow even the content processing apparatus 200 and the head-mounted display 100 that do not have wireless functions to perform wireless communication. Accordingly, the range of motion of the head-mounted display 100 can be further expanded.

It is noted that the apparatus to which the wireless connection adapter 152 for the display is connected is not limited to the head-mounted display but may be a general flat plate display apparatus or the like. For example, as in a case of monitors in the seats of vehicles such as trains, automobiles, and airplanes, in a case where an image output source apparatus and a display apparatus are far apart from each other or there are many display apparatuses, realizing wireless communication using the wireless connection adapters as illustrated in the figure can solve problems relating to cable routing.

Figure 12:
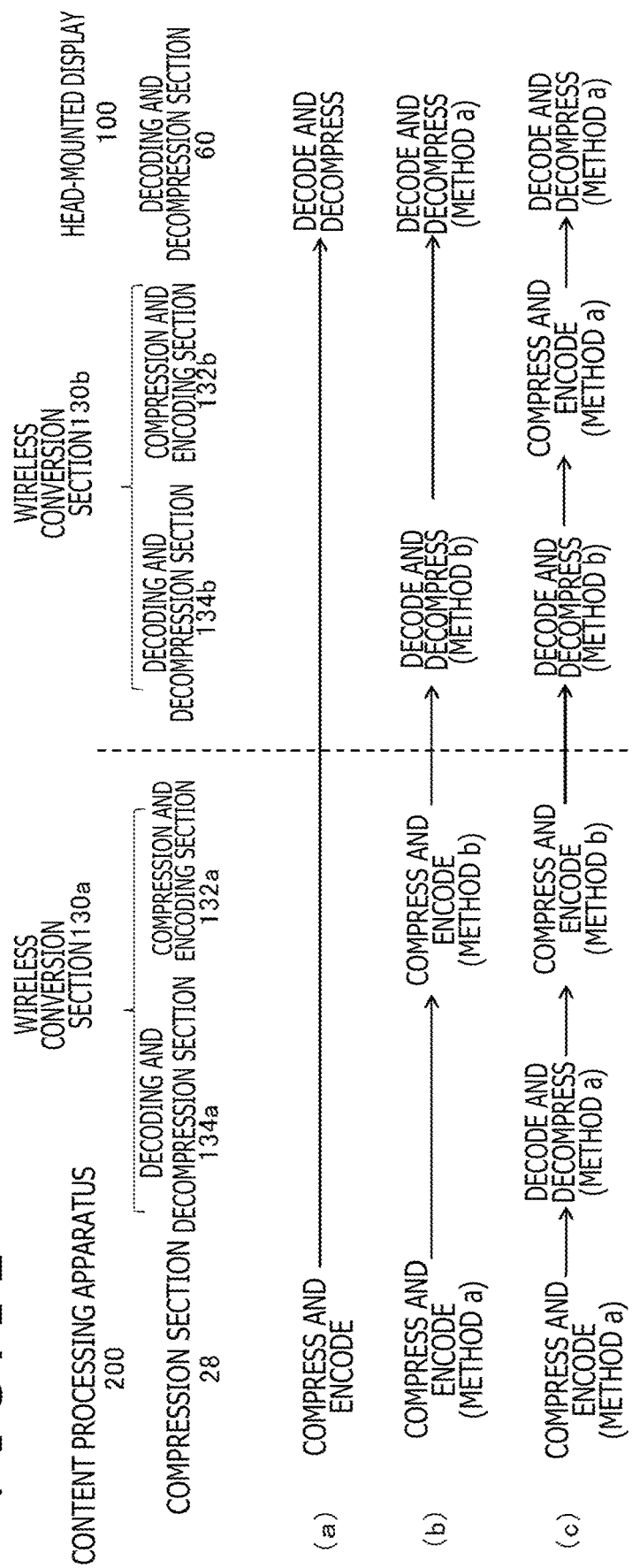
FIG. 12 is a diagram exemplifying a flow of processing of compression and encoding and decoding and decompression that can be implemented in a case where the interface illustrated in FIG. 10 is introduced into the present embodiment.

Assume a case where the interface 310 is applied to the present embodiment as illustrated in the figure. In this case, in a case of functions that overlap between the content processing apparatus 200 and the head-mounted display 100, either one of these functions may be turned off, or these functions may be used in combination. FIG. 12 exemplifies a flow of processing of compression and encoding and decoding and decompression that can be implemented in a case where the interface 310 is introduced. In a case of (a), the functions of the compression and encoding processing and the decoding and decompression processing in the wireless conversion sections 130a and 130b are turned off, and the decoding and decompression section 60 of the head-mounted display 100 decodes and decompresses the data that has been compressed and encoded by the compression section 28 of the content processing apparatus 200.

In a case of (b), the compression and encoding section 132a of the wireless conversion section 130a uses a method ("method b") for wireless transfer to compress and encode the data that has been compressed and encoded by the compression section 28 of the content processing apparatus 200 by using another "method a." That is, in this case, the data to be transferred is compressed and encoded twice. Then, the decoding and decompression section 60 of the head-mounted display 100 uses the "method a" to decode and decompress the data that has been decoded and decompressed by the decoding and decompression section 134b of the wireless conversion section 130b on the receiving side by using the "method b." In a case of (c), the decoding and decompression section 134a of the wireless conversion section 130a decodes and decompresses the data that has been compressed and encoded by the compression section 28 of the content processing apparatus 200 by using the "method a," and then the compression and encoding section 132a uses the method ("method b") for wireless transfer to compress and encode the data.

Then, the compression and encoding section 132b of the wireless conversion section 130b on the receiving side uses the "method a," which is the same method as the compression section 28, to compress and encode the data that has been decoded and decompressed by the decoding and decompression section 134b by using the "method b." The decoding and decompression section 60 of the head-mounted display 100 decodes and decompresses the data by using the "method a." By using one of these processing flows or other combinations, the interface 310 can be introduced into the present embodiment, and the effects described above can be obtained.

INDUSTRIAL APPLICABILITY

In this manner, the present invention is applicable to a content processing apparatus, an image processing apparatus, a game apparatus, a display apparatus, a head-mounted display, a content processing system including them, and the like.

REFERENCE SIGNS LIST

20: Data generation section
24: Data conversion section
26: Data input/output section
28: Compression section
30: Data formation section
32: Encryption processing section
40: Data input/output section
42: Relay section
44: Image data output section
46: Sound data output section
48: Detection value acquisition section
50: Encryption processing section
52: Data separation section
54: Output order control section
56: Clock control section
58: Data analysis section
60: Decoding and decompression section
94: Phase comparison section
96: Clock adjustment section
98: Clock generation section
100: Head-mounted display
110: Speaker
112: Sensor
122: Display panel
123: Display section
130a: Wireless conversion section
142a: Wireless transmission/reception section
150: Wireless connection adapter for information processing apparatus
152: Wireless connection adapter for display
200: Content processing apparatus

The invention claimed is:

1. An image processing system comprising:
   processing circuitry configured to
      compress data of an image to be transmitted through a first interface, wherein the data of the image is compressed in units of each of regions determined based on a method of a display panel included in a display,
      relay transmission of the data of the image from the first interface to a second interface with a different protocol,
      display the data of the image transmitted through the second interface,
      wherein the data of the image is relayed without decompressing the data of the image, and
      decompress and display the data of the image.

2. The image processing system according to claim 1, wherein the processing circuitry is further configured to
   drive the display panel for each of display regions obtained by dividing a screen of the display panel into a plurality of regions, and
   compress the data of the image in a lossy manner for each of the display regions or for each of regions obtained by dividing the display regions.

3. The image processing system according to claim 2, wherein the processing circuitry is further configured to
   on a basis of a positional relationship between the display regions and the regions used as units of compression, distribute the data of the image to corresponding interfaces among a plurality of the second interfaces each provided for a corresponding one of the display regions.

4. The image processing system according to claim 2, wherein processing circuitry is further configured to
decompress the data of the image for each of the display regions.

5. The image processing system according to claim 1, wherein processing circuitry is further configured to
acquire information relating to a clock that determines a timing at which the data of the image is transmitted through the first interface and adjust a clock that determines a timing at which the image is displayed.

6. The image processing system according to claim 1, wherein the processing circuitry is further configured to
output the data of the image to the display without waiting for acquisition of the data of the image for one frame.

7. The image processing system according to claim 1, wherein the processing circuitry is further configured to
decrypt the data of the image that has been encrypted and acquired through the first interface and input the data of the image into the second interface.

8. The image processing system according to claim 1, wherein the processing circuitry is further configured to
determine control information for controlling a display panel in the display by analyzing the data of the image and transmit the control information to the display.

9. An image processing integrated circuit, wherein the image processing integrated circuit is configured to:
acquire data of an image that has been compressed and transmitted through a first interface, wherein the data of the image is compressed in units of each of regions determined based on a method of a display panel included in a display,
transmit the data of the image to the display panel through a second interface whose protocol is different from a protocol of the first interface, and
transmit the data of the image without decompressing the data of the image.

10. An image processing method performed by an image processing system, the image processing method comprising:
compressing data of an image to be transmitted through a first interface, wherein the data of the image is compressed in units of each of regions determined based on a method of a display panel included in a display;
relaying transmission of the data of the image from the first interface to a second interface with a different protocol; and
displaying the data of the image transmitted through the second interface,
wherein the data of the image is relayed without decompressing the data of the image, and
decompressing and displaying the data of the image.

11. The method of claim 10, further comprising:
driving the display panel for each of display regions obtained by dividing a screen of the display panel into a plurality of regions; and
compressing the data of the image in a lossy manner for each of the display regions or for each of regions obtained by dividing the display regions.

12. The method of claim 11, further comprising:
on a basis of a positional relationship between the display regions and the regions used as units of compression, distributing the data of the image to corresponding interfaces among a plurality of the second interfaces each provided for a corresponding one of the display regions.

13. The method of claim 11, further comprising:
decompressing the data of the image for each of the display regions.

14. The method of claim 10, further comprising:
acquiring information relating to a clock that determines a timing at which the data of the image is transmitted through the first interface and adjust a clock that determines a timing at which the image is displayed.

15. The method of claim 10, further comprising:
outputting the data of the image to the display without waiting for acquisition of the data of the image for one frame.

16. The method of claim 10, further comprising:
decrypting the data of the image that has been encrypted and acquired through the first interface and input the data of the image into the second interface.

17. The method of claim 10, further comprising:
determining control information for controlling a display panel in the display by analyzing the data of the image and transmit the control information to the display.

18. A non-transitory computer-readable storage medium storing computer-readable instructions thereon which, when executed by a computer, cause the computer to perform a method, the method comprising:
acquiring data of an image that has been compressed and transmitted through a first interface, wherein the data of the image is compressed in units of each of regions determined based on a method of a display panel included in a display; and
transmitting the data of the image to a display panel through a second interface whose protocol is different from a protocol of the first interface; and
wherein the data of the image is transmitted without decompressing the data of the image.

* * * * *